April 18, 1944.  E. W. VREDENBURG  2,346,882
NET AND GROSS WEIGHER
Filed Feb. 24, 1941  3 Sheets-Sheet 1
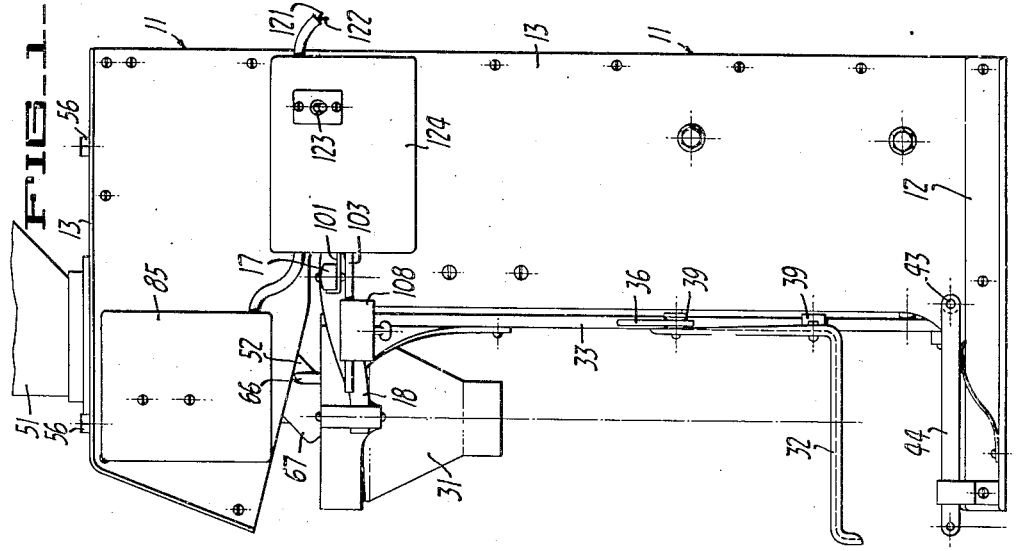
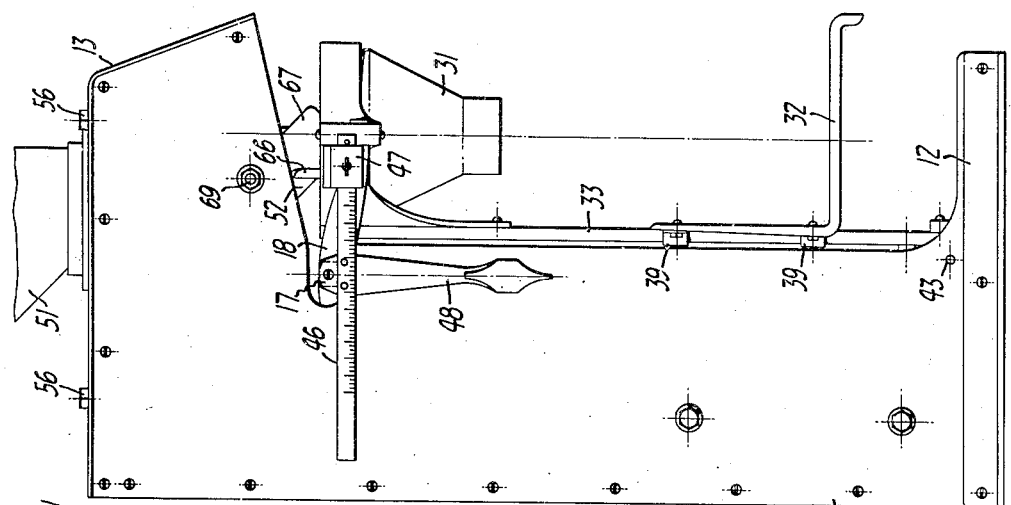
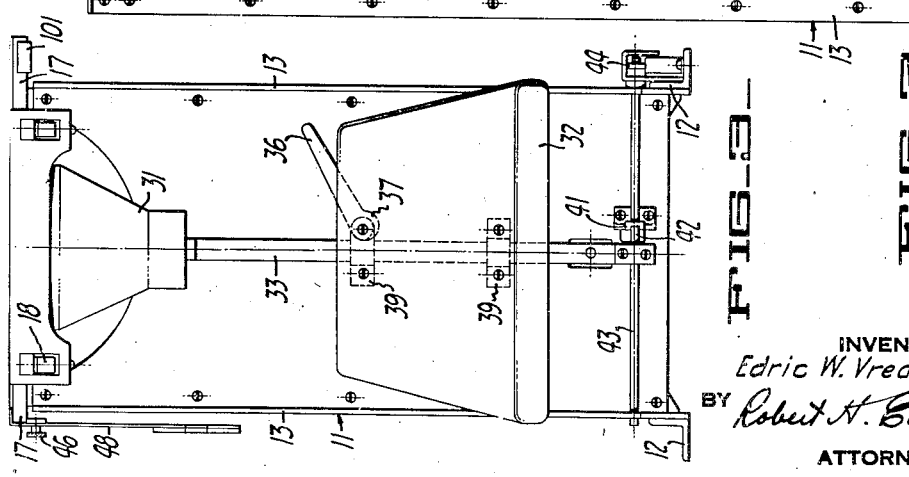
INVENTOR
Edric W. Vredenburg
BY Robert N. Eickhoff
ATTORNEY April 18, 1944.  E. W. VREDENBURG  2,346,882
NET AND GROSS WEIGHER
Filed Feb. 24, 1941  3 Sheets-Sheet 2
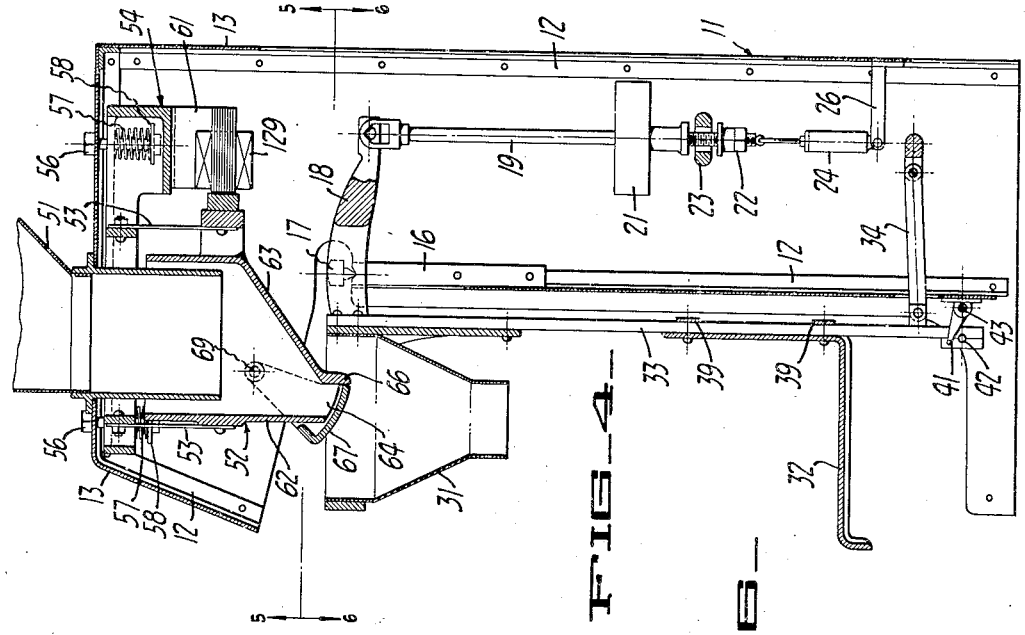
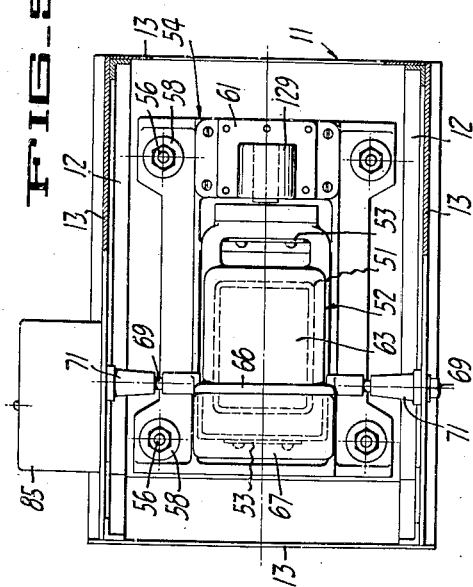
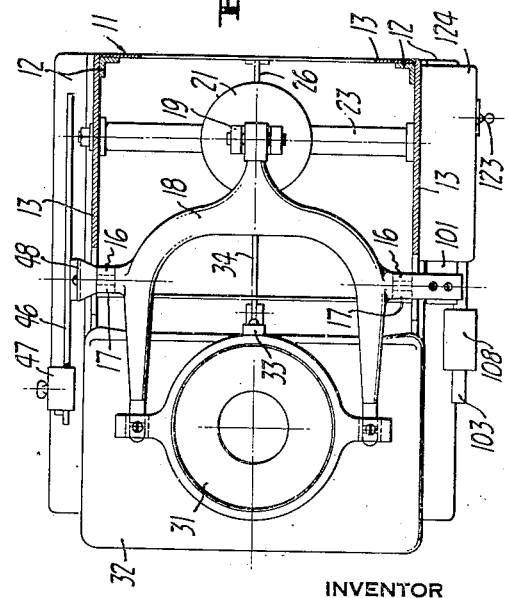
INVENTOR
Edric W. Vredenburg
BY Robert H. Eckhoff
ATTORNEY April 18, 1944.   E. W. VREDENBURG   2,346,882
NET AND GROSS WEIGHER
Filed Feb. 24, 1941   3 Sheets-Sheet 3
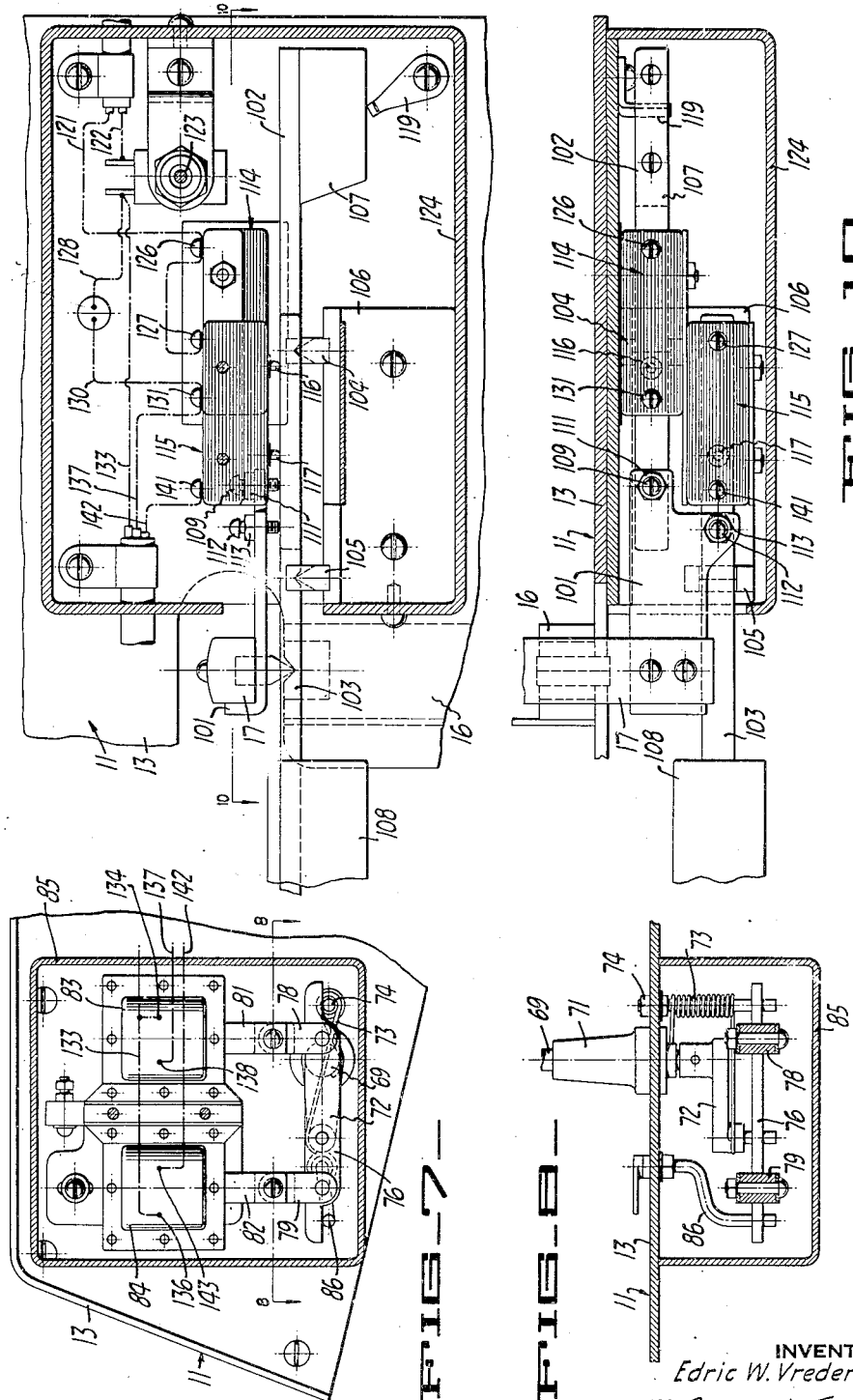
INVENTOR
Edric W. Vredenburg
BY Robert H. Eckhoff
ATTORNEY Patented Apr. 18, 1944

2,346,882

UNITED STATES PATENT OFFICE 2,346,882

NET AND GROSS WEIGHER

Edric W. Vredenburg, Oakland, Calif.

Application February 24, 1941, Serial No. 380,171

1 Claim. (Cl. 221—118)

This invention relates to a net and gross weigher, particularly one designed for rapid measuring out of selected weights of bulk materials such as dry peas, beans, corn meal, salt, sugar, candy and other like commodities to be weighed out, either in net or gross batches. The weigher of the present invention is simple, rugged and rapid in operation. It can be adjusted readily to measure out a batch on either a net or a gross weight and it can be adjusted to weigh various weights readily. Further, it is so fashioned that it is relatively fool-proof and requires a minimum of attention for its efficient operation.

While many free flowing materials can be fed by gravity, in the handling of some bulk materials difficulty is encountered in maintaining a flow of the material from a supply thereof during weighing of the material as a batch; this is particularly so with the handling of small batches of some materials. The weighing mechanism of this invention involves a combined gravity feed-vibrator feed. On free flowing material gravity alone can be employed while on others the two are employed together. The construction is such that bulk materials may be readily weighed out even though the flow thereof from a supply is an intermittent one and even though the quantity weighed is relatively small.

In the weighing of material it is, of course, usual to have the bulk feed followed by a dribble feed to the end that the final weight be accurately attained and underweight avoided. The weighing mechanism of the present invention involves a novel, bulk feed-dribble feed control mechanism.

It is in general the object of this invention to provide a weighing mechanism in which the supply of material from a bulk source is maintained in such a manner that small batches may be quickly and yet accurately apportioned and weighed.

In addition to the foregoing, the invention has other novel and valuable objects and features of advantage, some of which, together with the foregoing, will appear hereinafter wherein the present preferred form of weigher embodying the invention is disclosed.

In the drawings accompanying and forming a part hereof

Figures 1 and 2 are side elevations of the weigher mechanism of the present invention, while Figure 3 is a front elevation of a portion of the mechanism.

Figure 4 is a vertical cross section taken through the weigher mechanism shown in Figure 1.

Figures 5 and 6 are sections taken along the lines 5—5 and 6—6 in Figure 4.

Figure 7 is a side elevation, partly in section, through the solenoid box while Figure 8 is a section taken along the line 8—8 of Figure 7 and showing the control of the hopper closure mechanism.

Figure 9 is a side elevation partly in section through the switch control box while Figure 10 is a section taken along the line 10—10 of Figure 9.

The frame

The machine of the present invention includes a suitable frame generally indicated at 11 and made up of suitable angle iron members 12 and other structural elements as well as sheet metal elements 13 providing suitable sides, a top and a back.

The weighing mechanism

The weighing mechanism includes pivot blocks 16 suitably secured on opposite sides of the frame 11 and engaged by pivots 17 carried upon the U weighing frame member 18 shown in plan in Figure 6. A counter-balance and weight support 19 is mounted at one end of the weighing frame, as appears in Figures 4 and 6; this support carries a suitable platform 21 to receive auxiliary weights. This platform is ordinarily movable on the support 19 so that, in conjunction with nuts 22 the degree of movement of the weighing frame can be controlled through cooperation between the nuts 22, the platform 21 and a stop 23 extended between the sides of the frame 11 (Figures 4 and 6). The end of the support 19 carries dashpot 24 mounted between it and an extension 26 on the frame 11. The dashpot is such that it prevents extreme fluctuations of the weighing frame in either direction but does not interfere with accurate weighing. As is well known, the dashpot includes a chamber containing a fluid as kerosene. This is forced to flow from one side of a piston to the other through a controllable orifice whereby the rate of travel of the piston under a given force is varied. By varying the dashpot adjustment, one can increase or decrease the dribble by permitting the beam to move fast or slow, particularly during that period just prior to the dribble feed being cut off.

A suitable discharge hopper or funnel 31 is carried by the weighing frame as well as package support means 32 shown as a platform. The platform is slidably mounted on a member 33 which depends from the weighing frame and is guided at its lower end by link 34.

The position of the weighing platform 32 on member 33 can be readily adjusted by means of lever 36. This has an eccentric 37 (see Figure 3) thereon engaging the member 33 and releasably clamping the member between the eccentric 37 and one of the two straps 39 which support the platform movably on the frame 33. The weighing frame and the platform are locked in position when a package is removed therefrom by engaging finger 41 with a rod 42 (Figure 4) projecting from member 33. The finger is mounted on a shaft 43 carried in the frame and rotated by lever 44 (Figure 1), which can be operated by hand or by a foot pedal (not shown).

In place of the funnel 31 one can employ instead the batch receiving and retaining member shown at 51 in my copending application Serial Number 296,579 filed September 26, 1939, now Patent No. 2,314,299, or a like structure, such structures being generally known in the prior art.

On one side of the weighing frame (Figure 2) is mounted a lever arm 46 carrying thereon an adjustable weight 47. These are employed to tare the weight of a receptacle placed on the platform 32, for example, if the device be employed as a net weigher or to otherwise adjust the weight to which the frame is responsive in its movement. Also, on this side of the weighing frame is an indicator arm 48. This is employed in checking the scale for balance and, if desired, in checking each batch weighed in conjunction with a fixed mark provided on the side of the machine adjacent to the end of the arm. The end of the arm 48 is preferably fashioned with a weighted head thereon. This head causes the arm to act as a pendulum and so increase the sensitiveness of the weighing mechanism.

The feed

Mounted at the top of the frame 12 and extending therefrom to a source of bulk supply is a suitable conduit 51 discharging into a hopper 52. This hopper is supported by spring strips 53 at opposite ends thereof from a heavy, cast metal vibrator frame indicated generally at 54. The vibrator frame 54 is in turn supported from the top of frame 11 by bolts 56 which extend through the top of the frame 11 and springs 57 are placed between the frame 54 and washers 58 on the bolts 56 so that the entire vibrator frame, as well as the hopper are supported for vibration. Vibration from the frame 54 is thus restricted and is not transmitted to any appreciable degree to the frame 11 or to the support for the weighing mechanism. The frame 54 is made relatively heavy in mass so that an electrical vibrating mechanism 61 supported thereon is effective in cooperating with the hopper frame 54 and vibrating the hopper together with material therein.

The hopper discharge control

It is to be noted that the hopper includes a vertical side 62 and another side 63 which extends vertically and then inwardly toward side 62 and toward a discharge opening 64; adjacent discharge opening 64 wall 63 includes a lip 66 over which the material passes.

A discharge control element indicated generally at 67 is mounted upon stub shafts 69 which extend inwardly from frame 11 to support the discharge control element independently of the hopper (Figs. 5 and 8). The discharge control element is ordinarily movable between an open and a closed position; in the open position the element 67 is moved away from lip 66 and only partially covers opening 64 and free discharge from the hopper is permitted while in the closed position the element 67 is against lip 66 and discharge is entirely restricted. This construction, in conjunction with the vibration of only the hopper, is particularly effective in the handling of semi-free flowing or lumpy bulk materials; with the closure element in open position and with the hopper alone vibrated, material positioned between the discharge control element 67 and the lip 66 is vibrated very effectively between a stationary member and a vibrating member whereby lumps or granules of material which would otherwise interfere with free flow to the discharge opening 64 are broken up and pass on freely.

Discharge control

The stub shafts 69 supporting the closure element 67 are carried in suitable bearings 71 mounted upon the side of the machine. Upon one stub shaft (Figure 8) is mounted a bell crank 72 normally biased in a counterclockwise direction in Figure 7 by a spring 73 mounted upon an extending stationary pin 74 supported on the frame of the machine. One end of the bell crank is mounted upon the stub shaft while the other end is engaged with a lever 76 intermediate the ends thereof. To adjacent opposite ends of the lever links 78 and 79 are secured. These are respectively attached to solenoid plungers 81 and 82 associated with a first solenoid coil 83 and a second solenoid coil 84 mounted in a closure 85 upon the side frame of the machine. Normally, lever 76 is supported between pin 74 and adjustable stop 86 secured to the side of the frame 11. As will presently appear, under the control of the weighing mechanism the first solenoid coil 83 is energized simultaneously with the second solenoid coil 84 whereby plungers 78 and 79 are raised simultaneously. This is effective to rock the bell crank 72 clockwise in Figure 7 whereby the hopper closure element 67 is rocked clockwise in Figure 4 and bulk material in the hopper can discharge. As will also presently appear, the vibrating element 61 is energized simultaneously with solenoid coil 83.

The weighing frame rocks about its pivot upon discharge of material into a suitably positioned bag or receptacle thereon; this is effective, as will presently appear, to cause the second solenoid coil 84 to be deenergized whereby its plunger 82 drops and lever 76 engages the stop 86. This closes partially the closure element 67 and the feed from the hopper is decreased to a lesser rate, the dribble feed. The size of the opening between the closure element and the lip 66, that through which the dribble passes, is controlled by the adjustable stop 86.

When the weighing frame has approached and is in that position corresponding to the weight for which it is adjusted, the energization of the vibrating mechanism and the first solenoid 83 is discontinued and the first plunger 81 is permitted to drop and the closure element is moved into closed position. The foregoing operation will be further described in conjunction with the following mechanism. Of course, in place of solenoids and electrical vibrating mechanisms, other mechanisms can be used to effect vibration and movement of the plungers. However, I prefer to employ the electrical means described, particularly because of the quick, accurate control thereby assured.

Vibrator and discharge control mechanism

In accordance with this invention I mount a plate 101 on the side of the weighing frame as appears in Figures 1 and 9. This plate is employed as a control element, extending horizontally from the weighing frame over a first beam 102 and a second beam 103. These beams are respectively supported upon pivots 104 and 105 carried by a suitable support structure 106 on the side frame of the machine. Each beam respectively carries an adjustable counter-weight 107 and 108 thereon. Beam 102 is engaged by a screw 109 which is locked in position with a lock nut 111 so that the movement of the beam 102 can be coordinated with that of the weighing frame. A screw 112 and a lock nut 113 serve the same function with respect to beam 103. Suitably supported on the sides of the machine and positioned with their operating elements extending downwardly are Micro-switches 114 and 115 respectively operated by beams 102 and 103. The construction of these switches is that of the well-known structure sold under this trade name and more particularly described in Patent No. 1,960,020 issued May 22, 1934. As is well known, each Micro-switch includes an operating element extending therefrom (elements 116 and 117 in switches 114 and 115) which element is movable over a very short distance, against the opposition of a spring therein, to open a circuit. Switch 115 is placed with its operating element spaced from the associated pivot 105 for the beam 103 for some distance. Thus, a relatively small movement in the weighing frame is permissible before beam 103 is effective to move element 117 inwardly and open the circuit through the switch. Switch 115 ordinarily controls the closing of the hopper discharge control element 67 to provide a dribble feed.

It is to be noted that switch control element 116 is placed relatively close to pivot 104 so that comparatively beam 102 can swing through a very large path before the switch is opened. The switch is thus able to control the final dribble feed as well as the vibrator. A stop 119 is provided to engage the counter-weight 107 and restrict the downward movement of the counter-weight and thus prevent too much pressure from being placed upon the spring in the switch 114.

The circuit

Power is ordinarily supplied to the device through power lines 121 and 122. A control switch 123 is provided on the side of the enclosure 124 (Figures 1 and 9) and power lead 122 is ordinarily connected to one side of the switch while power lead 121 is connected to terminal 126 on switch 114 and terminal 127 on switch 115. The other side of switch 123 is connected by line 128 to coil 129 in the electrical vibrator 61, the other side of the coil being connected by line 130 to terminal 131 on switch 114. The other side of switch 123 is also connected to a line 133 which extends to the terminals 134 and 136 in solenoids 83 and 84 respectively. Terminal 131 on switch 114 is connected by line 137 to terminal 138 in solenoid 83 while terminal 141 in switch 115 is connected by line 142 to terminal 143 in solenoid 84. Switch 114 is thus effective to control the energization of the vibrator coil when it is in a closed position as well as the energization of solenoid 83 while switch 115 is effective to control the energization of solenoid 84.

As the weighing frame is loaded with a batch of materials, the switches are successively opened, first to close the hopper discharge partially and provide a suitable dribble feed and second, to discontinue the vibration and close the hopper discharge, the closing of the hopper discharge and cessation of vibration being effected simultaneously.

The switch structure disclosed is particularly advantageous because with the first beam 102 and the second beam 103 supported upon the sharp knife-edge pivots 104 and 105, each beam protects its pivot support from dust or collection of other foreign matter which might clog or tend to increase the resistance to operation of the beam. As a result, the weighing operation is unaffected over relatively long periods of time and little attention need be paid to the weigher.

The size of the counter-weights and their position on the beams depends on the relative position of the supporting pivots 104 and 105 for the beams 102 and 103, the distance of the switch elements 116 and 117 from the pivots and point whereat the moving force is applied to each beam. Those skilled in the art may make suitable modifications therein to the end that the required operating pressure for the switches be kept to a very small value. Normally the commercial Micro-switch requires about fourteen ounces of pressure to open the normally closed switches. By employing the counter-weights, this pressure is largely offset so that the pressure required from the weighing mechanism is very slight. With free flowing materials the vibrating mechanism and its control can, of course, be omitted.

I claim:

In a device of the character described, a hopper for receiving material and for feeding material through an outlet therefrom to a container positioned to receive a batch of material, electrical means for vibrating said hopper to move material out of said hopper, a gate cooperating with said hopper outlet and movable with respect to said hopper outlet to provide (1) a first discharge opening from said hopper through which material can pass to said container at a first rate, (2) a second discharge opening from said hopper of a size less than said first opening through which material can pass to said container at a second rate and which is less than first rate, and (3) a closure for said hopper outlet cutting off all material flow therefrom, a first solenoid effective upon energization to move said gate from hopper closed position to said second discharge position, a second solenoid effective upon energization concurrently with said first solenoid to move said gate to said first discharge position, a first Micro-switch effective to control simultaneous energization of said vibrator means and said first solenoid, and a second Micro-switch effective to control energization of said second solenoid.

EDRIC W. VREDENBURG.